(No Model.)
H. HOWSON.
MODE OF AND MECHANISM FOR FORMING UNDERGROUND CONDUITS.
No. 291,849. Patented Jan. 8, 1884.
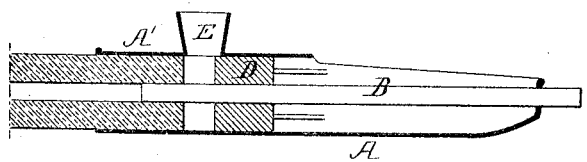
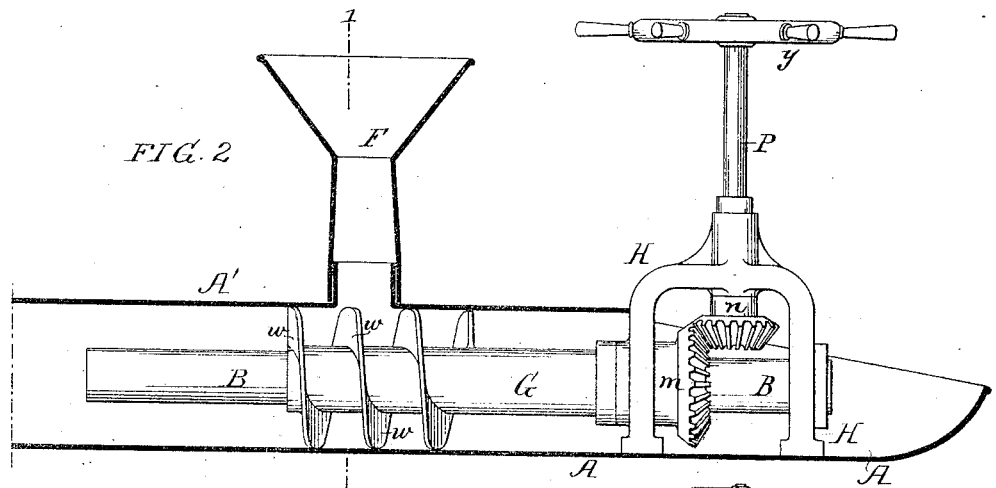
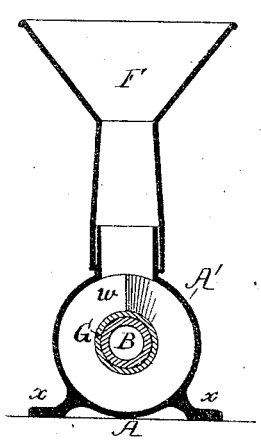
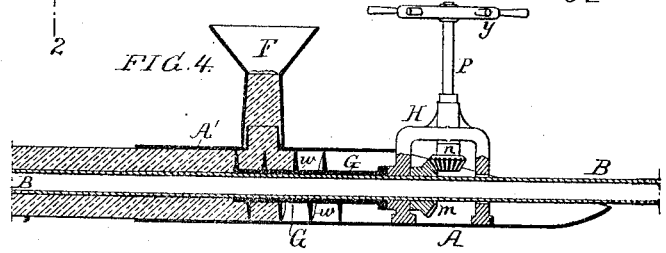
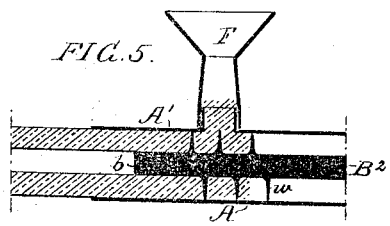
WITNESSES:
John M. Clayton.
John E. Parker.
INVENTOR,
Henry Howson,
by his Attorneys
Howson & Son

UNITED STATES PATENT OFFICE.

HENRY HOWSON, OF PHILADELPHIA, PENNSYLVANIA, ASSIGNOR TO CALVIN DETRICK, OF NEW YORK, N. Y., AND EPHRAIM WARD BOND, OF SPRINGFIELD, MASSACHUSETTS.

MODE OF AND MECHANISM FOR FORMING UNDERGROUND CONDUITS.

SPECIFICATION forming part of Letters Patent No. 291,849, dated January 8, 1884.

Application filed November 26, 1883. (No model.)

*To all whom it may concern:*

Be it known that I, HENRY HOWSON, a citizen of the United States, residing in Philadelphia, Pennsylvania, have invented certain Improvements in the Mode of and Mechanism for Forming Underground Conduits, of which the following is a specification.

My invention relates to an improvement in forming in trenches conduits of cement or other material, which soon becomes "set" or hard, my improvement being based on the plan described in the Patent No. 260,533, granted to W. M. Campbell, July 4, 1882, to which I will briefly refer here in connection with the diagram, Figure 1, of the accompanying drawings in order that my improvement may be more readily understood.

A plate or base, A, of which a tube, A', formed a part, was placed on the bottom of a suitable trench, and cement, introduced through a hopper, E, was packed by a plunger or piston, D, within the tube and round a series of formers, one former, B, only being shown in Fig. 1. The plunger was arranged to slide on the former, a reciprocating motion being imparted to the plunger by mechanism, which need not be explained. As the cement was packed by the plunger, the plate A, with the tube, hopper, former, plunger, and mechanism for operating the same, retreated and left behind a cement conduit on the bottom of the trench.

The main object of my invention is to pack the cement more uniformly than can be done by the reciprocating plunger shown in Campbell's patent.

In carrying out my invention I avail myself of an old combination of a screw, a casing, and former, which may be found in tile-machines in which the screw forces the clay through an orifice at the end of a casing and round a former in said orifice. (See Knight's dictionary, page 2570.)

In the operation of a tile-machine, however, the latter is fixed, and the clay forced out of the casing, whereas in my method the machine moves, leaving the conduit behind in the bottom of the trench. The mechanism, moreover, differs, as will be seen hereinafter, from that of a tile-machine which has been here referred to as exhibiting the state of the art prior to my invention.

Fig. 2 of the accompanying drawings is a side view, mainly in section, and Fig. 3 a transverse section, of the machine which I prefer to use in carrying out my invention, Figs. 4 and 5 representing modifications.

A tube, A', Figs. 2 and 3, the interior of which determines the diameter of the exterior of the conduit, is attached to or forms part of a suitable base, A, and communicating with this tube is a hopper, F. The base A is provided with steadying-flanges $x$ $x$, as shown in Fig. 3. A tubular screw-shaft, G, fitting on the former B so as to turn freely thereon, has a bearing in any suitable standard, H, secured to the base A, the spiral rib or thread $w$ of the screw-shaft being adapted to the interior of the tube A', so as to be rotated freely therein. The thread of the screw-shaft may be in sections, like the blades of a propeller, but the general character of the thread and its pitch will in a measure depend upon that of the cement or concrete used. The former is in this instance secured to the standard H, and the tubular shaft G is geared by bevel-wheels $m$ and $n$ to a vertical driving-shaft, P, which has its bearing in the standard H, and which is provided with a hand-wheel, $y$.

Different kinds of operating mechanism will readily suggest themselves to expert mechanics.

It is essential in all cases, however, whatever may be the character of the driving-gear, that the entire machine should be self contained, or, in other words, that the base should carry all the parts shown. Sometimes a conduit with a lining-tube is required, in which case this lining-tube becomes the former round which the cement is packed. Thus in Fig. 4 the tube B' passes through the tubular shaft G, and, not being connected to the machine, is left behind in the conduit, of which it forms a part.

Another modification of the machine is shown, Fig. 5, in which the screw is formed on the shaft B², which need not be tubular, an extension, $b$, of this shaft beyond the screw constituting the former, which moves back with the machine, the only difference between the action of this machine and that of the machine shown in Fig. 2 being that in one case the former revolves in the packed cement, while in the other case the former does not revolve. As the screw-shaft is turned the cement will be packed by a continuous operation, the density of the packed cement depending upon the resistance which the machine presents to the action of the screw.

In referring to "cement," the term is intended to apply to any material or composition which can be compressed into tubular form in the manner described.

I claim as my invention—

1. The mode herein described of forming underground conduits, the said mode consisting in the continuous packing of cement round a former within a tube, which retreats as the continuous packing proceeds, substantially as set forth.

2. A conduit-making machine in which the following elements are combined, namely: first, a base, A, tube A', and hopper communicating therewith; second, a shaft carried by the base, and having a spiral rib or screw-thread adapted to the interior of the tube; third, a former round which the cement is packed; and, fourth, mechanism for operating the said screw-shaft, all substantially as set forth.

In testimony whereof I have signed my name to this specification in the presence of two subscribing witnesses.

HENRY HOWSON.

Witnesses:
JOHN E. PARKER,
HENRY HOWSON, Jr.